L. J. W. S. and C. H. McCormick,
Mower.
No. 912 Reissued June 5 1860
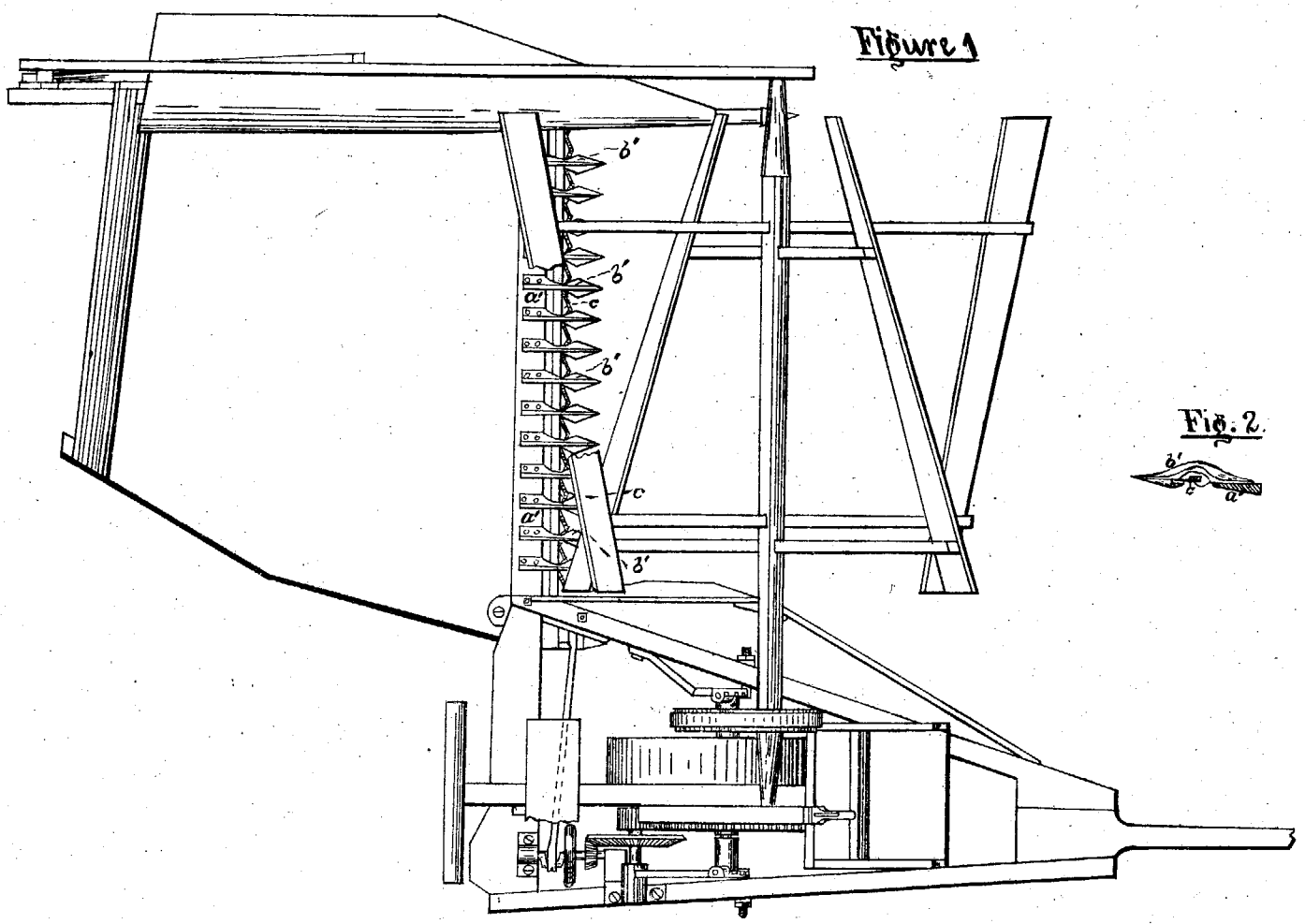

UNITED STATES PATENT OFFICE.

C. H. McCORMICK, OF CHICAGO, ILLINOIS, ASSIGNEE OF L. J. McCORMICK, W. S. McCORMICK, AND C. H. McCORMICK.

IMPROVEMENT IN REAPING AND MOWING MACHINES.

Specification forming part of Letters Patent No. 20,212, dated May 11, 1858; Reissue No. 972, dated June 5, 1860.

DIVISION No. 1.

*To all whom it may concern:*

Be it known that LEANDER J. McCORMICK, WILLIAM S. McCORMICK, and CYRUS H. McCORMICK, all of Chicago, in the county of Cook and State of Illinois, have invented certain new and useful Improvements in Reaping and Mowing Machines, of which the following is a full, clear, and exact description, reference being had to the accompanying drawings, making part of this specification, in which—

Figure 1 represents a plan of a reaping and mowing machine embracing said improvements, and Fig. 2 a cross-section of the finger-beam and cutter and a side elevation of the finger.

It is important in machines for mowing grass that the beam or bar which carries the guards or fingers and the cutter should slide easily over the ground, and especially that it should ride freely over such inequalities of the surface as usually exist in cultivated meadows, and at the same time it should carry the cutter with its edge near enough to the plane of the under side of the beam to cut leaning grass before the latter is reached and borne down by the front of the beam.

The invention which is the subject of this patent consists in constructing the beam which carries the fingers and cutter with a wedge-like cross-section, thin at its front edge, that it may not bear down leaning grass below the reach of the cutter, and thicker in rear to give it stiffness and strength. The beam thus formed should be so placed that its under side will slope downward from its front toward its rear, that it may act throughout its length and breadth in the manner of a sled-runner to pass readily and safely over soft or loose soil without sinking too deep, and over undulating surfaces without running into the protuberances.

The accompanying drawings represent a McCormick machine adapted to both reaping and mowing, and which embraces, among other things, our said improvement; but we deem it unnecessary herein to describe any more of the machine than is required for an explanation of the arrangement and operation of our said improvement.

The finger-beam *a'* is a bar of iron, which in its cross-section is wedge-formed. To its upper surface the fingers *b'* are secured. The forward edge of this bar should be thin and the back edge thick from end to end. The sickle *c* is arranged to play through the slots of the fingers with its cutting-edge as low or nearly as low as the plane of the under surface of the beam and in advance of the forward edge of the beam. The beam is so arranged that its under surface slopes downward from its front edge toward its rear, to give it the properties of a sled along its entire length. The bottom of the beam is sloped, and its front edge is so thin that in mowing grass which leans forward the under side of the bar will not beat or force the grass down below the plane of action of the sickle, but will permit it to be reached and cut by the sickle, which important result could not in many cases—as, for example, when the grass is leaning much in the direction in which the machine is advancing—be attained, if the bar were of equal thickness in front and rear, if the cutter were placed in or near the plane of the top of the bar in the usual position.

What is claimed under this patent as the invention of the said LEANDER J. McCORMICK, WILLIAM S. McCORMICK, and CYRUS H. McCORMICK, is—

Making the finger-beam of a mowing-machine of a bar of iron wedge-formed in its cross-section, with its forward edge, which carries the fingers, made thin, that the sickle may act upon and cut leaning grass, and with its rear edge thick to obtain the required strength, and the under surface inclined and so arranged that it may act like a runner to pass and ride over the surface of the ground to keep the cutting-edge of the sickle clear of obstructions, while at the same time it can have access to leaning grass, all substantially as described.

In testimony whereof I have hereunto subscribed my name.

C. H. McCORMICK.

Witnesses:
ROBT. VINCENT,
D. C. JOHNSON.